United States Patent [19]

Campbell

[11] 4,299,274
[45] Nov. 10, 1981

[54] THERMAL ENERGY STORAGE DEVICE AND METHOD FOR MAKING THE SAME

[75] Inventor: Steve Campbell, Manchester, Mo.

[73] Assignee: Pipe Systems, Incorporated, Fenton, Mo.

[21] Appl. No.: 76,395

[22] Filed: Sep. 17, 1979

Related U.S. Application Data

[63] Continuation-in-part of Ser. No. 35,020, May 1, 1979, abandoned.

[51] Int. Cl.³ ............................................. F28D 21/00
[52] U.S. Cl. ................................. 165/104.17; 126/400; 252/70; 220/362; 220/363; 425/394; 425/392
[58] Field of Search ............... 165/104 S, 10; 126/400; 220/DIG. 14, 362, 363; 425/392, 394, 395

[56] References Cited
U.S. PATENT DOCUMENTS 2,846,421  8/1958  Pollock ......................... 165/104 S X
2,974,367  3/1961  Doering et al. ...................... 425/392
3,532,856 10/1970  Collins .......................... 165/104 S X
3,825,393  7/1974  Bittner et al. ....................... 425/392
4,062,347 12/1977  Jensen ........................... 165/104 S X
4,114,600  9/1978  Newton ......................... 165/104 S X Primary Examiner—Albert W. Davis
Attorney, Agent, or Firm—Glenn K. Robbins

[57] ABSTRACT

A thermal energy storage device and method for making the same. The thermal energy storage device is in the form of a sealed tube-like container such as a tube-like cylinder or other geometrical configuration partially filled with a phase change material such as calcium chloride hexahydrate. The cylinder is made of tubular high density polyethylene and more particularly an ultra high molecular weight high density polyethylene having a molecular weight of about 500,000 to 700,000 which is tough, chemically resistant, withstands low and high temperatures, acts as a moisture vapor barrier and can be fused and sealed. The calcium hexahydrate is filled in an open top cylinder, closed at the bottom by dissolving two parts of calcium chloride dihydrate with one part of water to provide calcium chloride hexahydrate in liquid form. The cylinder is filled to about 90% by volume and a cap of the same material is then preheated to about fusion temperature. The open top of the cylinder is then brought up to fusion temperature and the cap is fused to it under pressure.

11 Claims, 9 Drawing Figures

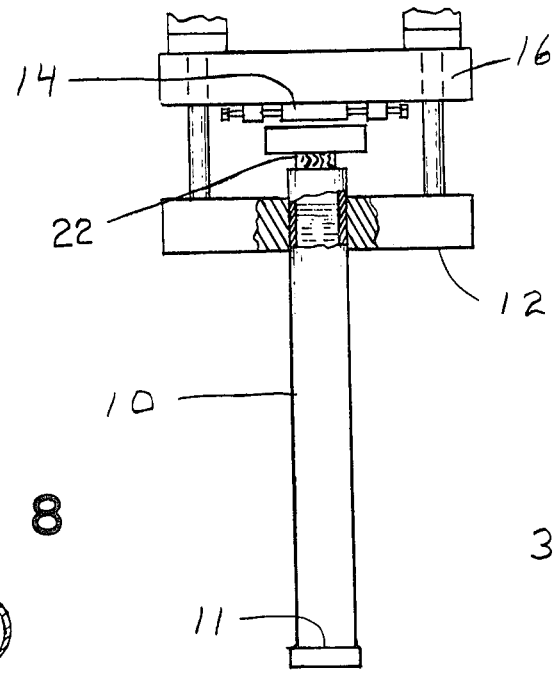
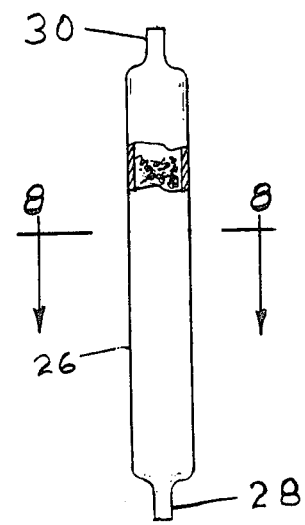
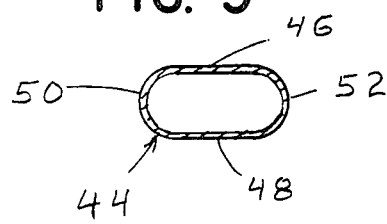
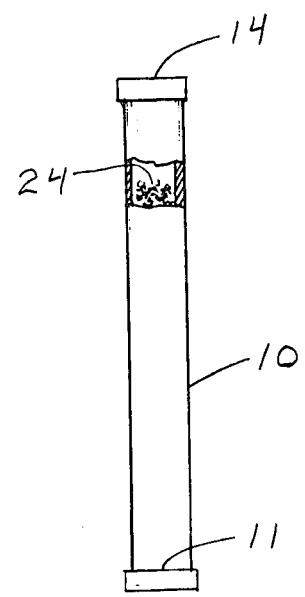

THERMAL ENERGY STORAGE DEVICE AND METHOD FOR MAKING THE SAME

RELATED APPLICATION

This application is a continuation-in-part application of my co-pending application Ser. No. 35,020, filed May 1, 1979, now abandoned.

SUMMARY OF THE INVENTION

In the past various types of phase change materials have been used in a variety of heating installations. These usages have been for thermal energy storage applications for water heating, solar heating, heat pump applications, and the like. The thermal energy storage devices are used as a means for storing thermal energy under various ambient conditions. The problem in encapsulating the phase change material has undergone various investigations and research as the encapsulating material must withstand the various stresses provided in the freeze-thaw cycles and pressures and other environmental factors adversely affecting the encapsulating material.

In particular the phase change material calcium chloride hexahydrate has been investigated as it is desireable for use in various domestic installations because its melting point of about 81° F. is compatible with domestic ambient temperatures. By means of this invention there has been provided an encapsulating material in the form of sealed cylinder of high density polyethylene which withstands high stresses encountered in the freeze-thaw cycles, the pressures developed therein the various environmental influences against which the thermal energy storage device must be designed to withstand attack.

The thermal energy storage device of this invention has been found to be able to withstand the rigors of freeze-thaw stresses. There has been provided a stable energy storage device which may be commonly termed a thermal energy cylinder or rod. The cylinder is constructed of high density polyethylene and more particularly an ultra high molecular weight high density polyethylene having a molecular weight in the order of 500,000 to 700,000. This material withstands the stresses of the freeze-thaw repeated cycles and low temperatures and the pressures developed in the cylinder in the cycles of use.

Further by means of this invention the phase change material such as calcium chloride hexahydrate has been made useable on a practical basis through the novel method for filling the containers such as tube-like cylinders and sealing the same. The calcium chloride hexahydrate is formed from calcium chloride dihydrate in the solid form. In the method of filling the cylinders, two parts of solid calcium chloride dihydrate are dissolved with one part of water by weight. In the process of dissolving the heat of solution develops a substantial degree of heat. Thus in changing to calcium chloride hexahydrate a temperature of about 130° F. is developed and the calcium chloride hexahydrate is thereby made available in liquid form until it cools below 81° F. The liquid is poured in an open top bottom end closed cylinder to about 90% of the interior volume. A cap of the same material as the cylinder is then preheated to approximately fusing temperature of about 500° F. while being supported in a hydraulic ram. The top end of the open top cylinder which has been partially filled with the calcium chloride hexahydrate in liquid form is then brought up to fusion heat and the cylinder and the cap are fused together under a pressure of about 150 psi.

The closing of the bottom and top ends may also be effected for simplicity and economy by pinch sealing. The pinch sealing may be either a flat pinch or to reduce distortion near the fused seal may be in the form of various non-linear configurations comprising X-shaped, Y-shaped and wave-shaped forms of pinching.

The tube-like container instead of being cylindrical may have cross-sections of varying geometrical configurations for ease in stacking and to present greater surface area for more efficient heat transfer. One such configuration that is desirable is one of a cross-section that is generally oblong having rounded sides.

The thermal energy storage device provided by the encapsulating cylinder for the calcium chloride hexahydrate is after the manufacture by the method of this invention made available for various types of usages in domestic or industrial installations as desired. The thermal energy storage device is rugged, can be easily handled and may be used in a variety of types of installations wherever a thermal energy storage device has a requirement for use.

The above features are objects of this invention and further objects will appear in the detailed description which follows and will be otherwise apparent to those skilled in the art.

For the purpose of illustration of this invention, there is shown in the accompanying drawings a preferred embodiment thereof. It is to be understood that these drawings are for the purpose of example only, and that the invention is not limited thereto.

IN THE DRAWINGS

FIG. 1, is a view in elevation showing the method of filling and sealing the thermal energy storage cylinder.

FIG. 2, is a view partly cut away showing the thermal energy storage cylinder after manufacture.

FIG. 3, is a view similar to FIG. 2, but showing a pinch sealed cylinder.

FIG. 8, is a view in cross-section taken on the line 8—8 of FIG. 3, cross-sectional.

FIG. 9, is a view of a modified tube-like container.

DESCRIPTION OF THE INVENTION

Figure 4:
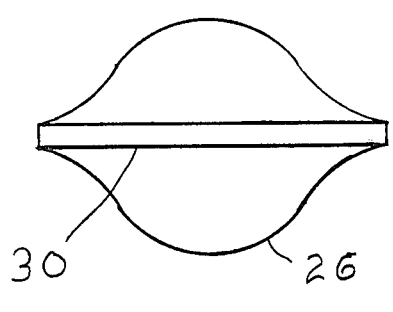
FIG. 4, is a top plan view of the pinch sealed cylinder of FIG. 3.

The phase change material used in this invention is calcium chloride hexahydrate. It is formed from calcium chloride dihydrate by mixing two parts of the dihydrate and one part of water by weight to form calcium chloride hexahydrate. In addition of water to the calcium chloride hexahydrate, because of the heat of solution, a temperature in the solution of 130° F. is developed. This feature is important, as will appear more fully hereinbelow, in the process of filling and sealing the tube-like container such as a tube-like cylinder of high density polyethylene since the melting point is 81° F. for the calcium chloride hexahydrate phase change material and at room temperature it is 72° F. in solid form. Further, in the shipment of the calcium chloride dihydrate to the site of manufacture, the extra weight of the water is in the hexahydrate form obviated and eliminated from the shipment.

The calcium chloride dihydrate used is obtained from The Dow Chemical Company as DES, i.e. Dow Energy Storage Compound with nucleating agent to depress the melting point and inhibit supercooling of the liquid form of the converted calcium chloride hexahydrate. The nucleating agent effectively depresses the melting point from about 86° F. to about 81° F. to a temperature more compatible approximating the room temperature for domestic installations and inhibits supercooling to the point where the liquid would not freeze and whereby only sensible heat would be provided. In the thermal energy storage device the latent heat of fusion is desired to be realized in the phase change material to avoid the inefficiency of sensible heat development as much as possible. The latent heat of fusion of the calcium chloride hexahydrate is 46 calories per gram.

The encapsulating material used in this invention to provide the thermal energy storage device is ultra high molecular weight high density polyethylene having a molecular weight of about 500,000 to 700,000. This material is used for the tube-like cylinder provided to encapsulate the calcium chloride hexahydrate. As an example, the particular ultra high molecular weight high density polyethylene tubing employed is Driscopipe 7600, or 8600 manufactured by Phillips Driscopipe, Inc., a subsidiary of Phillips Petroleum Company. This material is a thermoplastic material lending itself to fusing and sealing and has a high degree of stress resistance, toughness, ability to act as a moisture vapor barrier, chemical resistance and ability to withstand high and low temperatures. This high density polyethylene is pressure rated at 73.4 degree F. to have high stress resistance and toughness qualities.

As an example, the thermal energy storage cylinder used in this invention, is made of Driscopipe 7600 to 8600 in the form of nominal 3 inch pipe having an average outside diameter of 3.5 inch and a wall thickness of 0.1 inch. The caps used to seal the bottom and top end of the cylinder are made of the same material but have a thicker wall thickness which may vary, but for purpose of illustration may be in the order of $\frac{3}{8}$ inch thickness.

In the method for making the thermal energy storage cylinder of this invention, an open top tube-like cylinder 10 as shown in FIG. 1 having a closed bottom 11 is supported within a jaw-like collar 12 with the bottom resting on the floor. The cap 14 for ultimately closing the top of the cylinder is supported in a ram 16 having set screws 17. The ram is operated hydraulically for vertical movement.

After the open top cylinders have been properly supported, the calcium chloride hexahydrate phase change material is then prepared. In this preparation the calcium chloride dihydrate with a nucleating agent is used which, per se, forms no part of this invention. Conventional nucleating agents, such as barium hydroxide may for example be employed as well as the material obtained from The Dow Chemical Company. The calcium chloride dihydrate is then mixed with water. In this mixing to form the calcium chloride hexahydrate, two parts of calcium chloride dihydrate are mixed with one part of water by weight in a suitable container. The solution thus obtained develops a temperature of 130° F. when the calcium chloride dihydrate which is in solid form dissolves in the added water. The calcium chloride hexahydrate in liquid form is then poured to a 90% fill in the open top cylinder. The cylinder is then ready for sealing while the calcium chloride hexahydrate is still in the liquid phase.

In the sealing operation a heater 20 is spaced above the open top of the cylinder by an insulating material such as a block of wood 22 to preheat the cap 14 to approximately 500° F. for the softening of the bottom portion of the cap to prepare it for fusing. The preheating is developed to prevent overheating of the thin cylinder walls at the open top of the cylinder which because of the lesser mass is more easily and more rapidly heated. After the preheating, the block is removed and the heater is used to bring the top portion of the open top cylinder to fusion temperature. When this has been obtained, the heater is removed and the ram is moved downwardly with the cap to apply a total pressure of about 750 pounds which develops a pressure of about 150 P.S.I. on the open top of the cylinder. This provides a fusion welding of the cap to seal the open top of the cylinder.

The sealed cylinder is then ready for use as a thermal energy storage device or cylinder or rod as it may commonly be termed. The 90% fill of liquid of the interior of volume leaves a 10% void. Upon ultimate freezing of the phase change material namely, the calcium chloride hexahydrate, a concentration in volume to 80% of the interior volume of the cylinder occurs. This then provides a void space of about 20% and prevents too much vacuum being applied which might tend to create undue stresses on the walls of the cylinder. The creation of the void space acts as a safety space to alleviate the internal pressures or vacuum that are developed in the thermal energy storage device upon filling and sealing.

The completed thermal energy storage device is shown in FIG. 2 with the interior portion shown in the break-away part of the drawing as 80% filled with solid phase change material 24 when subjected to normal room temperature at 72° F. The thermal energy storage cylinder with the phase change material withstands vigorous and repeated freeze-thaw cycles and the normal wear and tear in shipment and installation and the stresses of a variety of heating installations as desired. The cylinders, as mentioned previously may be of nominal three inch diameter and 6 feet in length which are not limiting factors but are described for purpose of example. Other changes in the wall thickness, diameter and length may be made as will be apparent to those skilled in the art.

In a modification shown in FIGS. 3, 4 and 8, a cylinder 26 of the same nature as cylinder 10 is first pinch sealed under fusion at the bottom to provide a pinch seal 28. The open top cylinder is then supported and filled in a similar manner to that described in FIG. 1. The open top wall is then heated in a similar manner and pinch sealed by conventional vise-like pressure means to provide a fusion sealed pinch closure 30.

Figure 5:
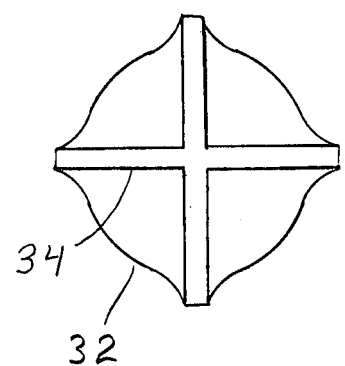
FIG. 5, is a top plan view of an X-shaped pinch sealed modification.
Figure 6:
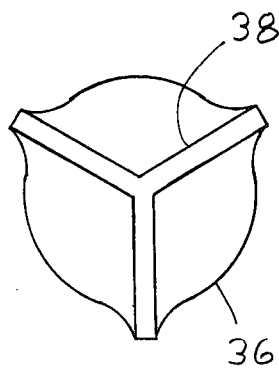
FIG. 6, is a top plan view of a Y-shaped pinch sealed modification.
Figure 7:
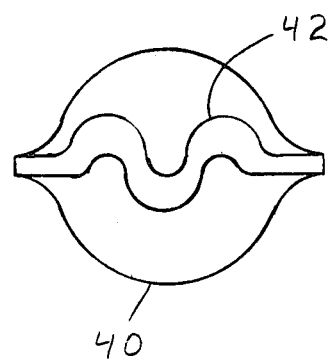
FIG. 7, is a top plan view of a wave-shaped pinch sealed modification.

Further modifications to provide pinch sealing to reduce distortion of the cylinder near the seal are shown in FIGS. 5, 6 and 7. These modifications provide angled or non-linear pinch configurations to minimize any tendencies for thermal distortion. FIG. 5, shows such modified cylinder 32 having a star shaped configuration in the form of an X-shaped pinch seal 34. FIG. 6, shows a modification 36 of the star shaped configuration having a Y-shaped pinch seal 38. FIG. 7, shows a modification 40 using a wave-shaped pinch seal 42.

The tube-like container instead of being in cylindrical form may take other geometrical configurations for ease in stacking and to effect greater surface area in the walls of the container to effect a more rapid heat transfer. Such a desirable modified tube-like container is designated by reference numeral 44 in FIG. 9. This container is generally oblong having parallel walls 46 and 48 with rounded sides 50 and 52. The cross-section of this container while being generally described as oblong may have rounded corners. When filled the sides or ends 50 and 52 may assume the rounded configuration shown in FIG. 9 due to the internal pressure exerted by the weight of the phase change material in the container and the parallel side walls 46 and 48 may have a lesser degree of bulge or slightly rounded shape. The increased surface area minimizes cold or hot spot development within the phase change material through more efficient heat distribution and also presents increased space utilization in stacking of the containers.

While this invention has been described with respect to the phase change material in the form of calcium chloride hexahydrate, other known phase change material having melting points and physical characteristics lending themselves to the method of manufacture may be used as will be readily apparent to those skilled in the art.

Various changes and modifications may be made within this invention as will be readily apparent to those skilled in the art. Such changes and modifications are within the scope and teaching of this invention as defined by the claims appended hereto.

What is claimed is:

1. A thermal energy storage device comprising an elongated rigid tube-like container having an interior opening partially filled with a phase change material, said container being sealed at opposed ends and constructed of a high density polyethylene having a molecular weight of about 500,000 to 700,000, at least one of said ends being fusion sealed by a pinch seal.

2. The thermal energy storage device of claim 1, in which the phase change material is calcium chloride hexahydrate and the container is cylindrical.

3. The thermal energy storage device of claim 1, in which the container has an elongated cross-section.

4. The thermal energy storage device of claim 3, in which the container has a cross-section having parallel walls and rounded sides.

5. The thermal energy storage device of claim 1, in which the interior opening is filled to about 90% of the volume of said interior opening with calcium chloride hexahydrate in liquid form, said calcium chloride hexahydrate when being subjected to freezing temperature in said container contracting upon freezing to solid form and filling about 80% of the interior volume of said container, said container having a void space in the interior volume caused by said partial filling with calcium chloride hexahydrate to minimize wall stresses in said container during repeated freeze-thaw cycles, and the calcium chloride hexahydrate having incorporated therewith a nucleating agent to inhibit supercooling.

6. The thermal energy storage device of claim 1, in which the pinch seal is flat.

7. The thermal energy storage device of claim 1, in which the pinch seal is angled.

8. The thermal energy storage device of claim 7, in which said container is fusion sealed at opposed end by a star shaped pinch seal.

9. The thermal energy storage device of claim 7, in which the pinch seal is wave-shaped.

10. The thermal energy storage device of claim 8, in which the pinch seal is X-shaped.

11. The thermal energy storage device in claim 8, in which the pinch seal is Y-shaped.

* * * * *